United States Patent Office

2,919,172
Patented Dec. 29, 1959

2,919,172

METHOD OF COLORING WOVEN GLASS FIBERS

Charles L. Lawsberg, Easton, Pa., assignor to General Aniline & Film Corporation, New York, N.Y., a corporation of Delaware No Drawing. Application November 20, 1952
Serial No. 321,740

7 Claims. (Cl. 8—8)

This invention relates to an improved process of coloring glass fibers and more particularly to the application of dyes to glass fabrics.

Fabrics of glass and particularly of woven glass have recently become important in the field of fabrics where they have a wide variety of uses. Their most important functions, as is the case with most fabrics, is to be decorative. For this purpose they should be capable of retaining a variety of colors. Great difficulty, however, has been encountered in attempts to dye glass fabrics. One method which has been used involves the metalizing of the fiber and applying basic dyes, but this has the disadvantages in that a very limited number of colors can be used and substantial crocking is obtained. Another general method which has been used involves the coating of the fabric with a material such as a gelatin or resin-pigment mixture. This method has the disadvantage of crocking appreciably.

It is, therefore, an object of the present invention to provide a process of coloring glass fibers, which is inexpensive and susceptible of use with a wide variety of dyes.

It is a further object of the present invention to provide a process of coloring glass fibers wherein an even application of dye is effected with a minimum of crocking.

It is a further object of the present invention to provide a process of coloring of glass fibers which gives an even application of bright or dark shades with a wide variety of colors.

These and other objects are attained by the present invention which comprises a process for coloring glass fibers such as woven glass fabrics wherein the glass fibers are first treated with an alkaline material yielding a pH in the range of 9 to 13, preferably a caustic material, such as sodium hydroxide. The fibers are then treated with an organic or inorganic compound containing an acid radical, preferably a water-soluble organic or inorganic salt.

The treatment with the aqueous alkali material involves heating the fabric from about 75° C. to boiling, as for example, heating the fabric in a mild alkali metal hydroxide solution for about an hour. While the alkaline material alone permits a coloring of the fabric not previously possible by a dyeing procedure, the coloring is made considerably more even by the addition to the alkaline bath of an organic or inorganic compound containing an acid radical, preferably a water soluble organic or inorganic salt.

The following examples illustrate preferred embodiments of the invention, but it will be understood that the invention is not limited thereto and that substitutions and variations may be made within the scope of the appended claims.

EXAMPLE I 100 parts of a woven glass fabric were immersed for 1 hour in an aqueous solution at 75° C. prepared by mixing 7.2 parts by weight of sodium hydroxide and 2 parts of sodium phosphate. The pH of the solution was 11.1. The treating fabric was rinsed in running water for several minutes and then treated with 3000 parts of an aqueous solution containing 3 parts of Benzo Fast Scarlet GS (Color Index 326) for 1 hour at 90–95° C. The fabric was rinsed in water and dried. The fabric, which had a deep scarlet color evenly distributed, showed good fastness to dry cleaning, substantial fastness to washing and no appreciable crocking.

EXAMPLE II 100 parts of a woven glass fabric were immersed for 1 hour in an aqueous solution at 75° C. prepared in the following manner:

7.2 parts by weight of caustic soda were dissolved in 2950 parts of water and to this solution 5 parts of hydrochloric acid of 41% concentration were added and the volume of the solution brought to 3000 parts. The pH of the resulting solution was between 11 and 12. The treated fabric was rinsed in running water for several minutes and treated at the boil in 3000 parts of an aqueous solution containing 3 parts of Wool Fast Blue GL extra (Color Index 833). The fabric was rinsed in water. The colored fabric was evenly colored, fast to dry cleaning, substantially fast to washing and had no appreciable crocking.

EXAMPLE III 100 parts of a woven glass fabric were immerced for 1 hour in an aqueous solution prepared by mixing 5.1 parts of sodium hydroxide and 3.3 parts of sodium sulfate and diluted with water to 3000 parts. The pH of the solution was 11.1. The treated fabric was rinsed in running water for several minutes and then treated with 3000 parts of an aqueous solution containing 3 parts of Pontamine Fast Pink BL (Color Index 353) for 1 hour at 90–95° C. The fabric was evenly colored, fast to dry cleaning, substantially fast to washing and showed no appreciable crocking.

EXAMPLE IV 100 parts of a woven glass fabric were immersed for 1 hour in an aqueous solution at 75° C. prepared by mixing 7.2 parts of potassium hydroxide with 38 parts of potassium acetate and diluted with water to 3000 parts. The treated fabric was rinsed in running water for several minutes and then treated in 3000 parts of an aqueous solution containing 3 parts of Fastusol Pink BBA Extra Concentrated dye for 1 hour at 90–95° C. The colored fabric was rinsed in water and dried. The dried fabric was evenly colored a deep shade and had no appreciable crocking.

EXAMPLE V 100 parts of a woven glass fabric were immersed for 1 hour in an aqueous solution at 75° C. prepared by mixing 7.2 parts of sodium hydroxide with 3000 parts of water and 4.5 parts of ammonium formate. The treated fabric was rinsed in running water for several minutes and then colored in 3000 parts of an aqueous solution containing 3 parts of Fastusol Pink BBA Concentrated dye for 1 hour at 75° C. The fabric was rinsed in water and dried. The dried fabric was evenly colored a deep shade and had no appreciable crocking.

EXAMPLE VI 100 parts of a woven glass fabric were immersed for 1 hour in an aqueous solution at 75° C. containing 7.2 parts sodium hydroxide with 4.3 parts of sodium propionate in 3000 parts of water. The treated fabric was rinsed in running water for several minutes and then colored in 3000 parts of an aqueous solution containing 3 parts of Fastusol Pink BBA Extra Concentrated dye for 1 hour at 90-95° C. The colored fabric was rinsed in water and dried. The dried fabric was evenly colored a deep shade and had no appreciable crocking.

EXAMPLE VII 100 parts of a woven glass fabric were immersed for 1 hour in an aqueous solution at 75° C. prepared by mixing 7.2 parts of sodium hydroxide with 6.5 parts of sodium chloride and diluted with water to 3000 parts. The treated fabric was rinsed in running water for several minutes and then colored in 3000 parts of an aqueous solution containing 3 parts of Wool Fast Blue GLA Extra Concentrated dye for 1 hour at 90-95° C. The fabric was rinsed in water and dried. The dried fabric was evenly colored a deep shade and had no appreciable crocking.

EXAMPLE VIII 100 parts of a woven glass fabric were immersed for 1 hour in an aqueous solution at 75° C. prepared by mixing 200 parts of a concentrated ammonium hydroxide and 7.2 parts of potassium borate in 3000 parts of water. The treated fabric was rinsed in running water for several minutes and then colored in 3000 parts of an aqueous solution containing 3 parts of Fastusol Pink BBA Extra Concentrated dye for 1 hour at 90-95° C. The fabric was rinsed in water and dried. The fabric had been evenly colored a medium shade and showed no appreciable crocking.

The alkaline material used in the present invention is preferably sodium hydroxide, but it may be any other organic or inorganic alkaline material including alkaline salts which are capable of yielding a pH in the range of 9 to 13 as, for example, ammonium hydroxide, sodium carbonate, potassium hydroxide, trisodium phosphate, sodium metasilicate, lithium carbonate, tripotassium phosphate, etc. The amount used may be varied over a wide range provided a sufficient amount is used to give a pH of at least 9 but an excess of a strong alkali is not as desirable as a lesser amount since it tends to yield less deep coloring. A pH of about 11 is preferable for the best coloring.

The acid radical may be introduced in the form of an inorganic or organic compound capable of yielding an acid radical and forming an alkali salt. The amount of acid radical yielding compound is critical and cannot be deviated for otherwise uneven coloring will take place. The compound containing the acid radical either free acid salt thereof or any compound yielding an acid radical should be employed within the critical range between 0.01% to not more than 10% based upon the weight of the fabric. As examples of compounds containing acid radicals the following may be mentioned: borates, chlorides, sulfates, phosphates, acetates, formates, propionates, oxylates, bromides, carbonates, bromates, and the like. These may be conveniently employed as the conventional and well known ammonium and alkali metal salts, such as ammonium, sodium, potassium, and the like.

Although any temperature ranging from 75° C. may be employed for the alkali treatment, a temperature close to the boiling point of the alkaline solution is best for uniform and dense dyeing effects. As regards the time, the alkaline treatment for a period of about 1 hour gives satisfactory results. For convenience, the treatment with the compound containing an acid radical either free acid or an ammonium or alkali metal salt may be simultaneous with the alkaline treatment or may follow it. The addition may take place simultaneously with the alkaline treatment or in a separate bath which is preferably heated.

The woven glass fabric, which is treated and colored in accordance with this invention, is prepared by making glass strands of a prescribed diameter, twisting the strands into yarn and weaving the same into a fabric. The production of the glass fibers is disclosed in United States Patents 2,068,202 and 2,068,203.

The dyes useful in the present process are, in general, those dyes which do not require chemical reduction in their application (as do vat dyes) and the following are examples:

Acid dyes

Wool Fast Violet B (Color Index 833)
Azine Green GB (Color Index 834)
Basle Blue R (Color Index 836)
Polar Red G. Conc. (Color Index 430)
Alizurol Ruby (Color Index 1091)
Solway Blue SE (Color Index 1053)
Alizarin Sapphire Blue B (Color Index 1054)
Acid Alizarin Blue BB (Color Index 1063)

Basic dyes

Union Blue B (Color Index 135)
Janus Gerey B, BB (Color Index 137)
Bismarck Brown G (Color Index 331)
Manchester Brown EE (Color Index 332)

Direct dyes

Direct Fast Orange SE (Color Index 326)
Chlorazol Fast Scarlet 4BS (Color Index 327)
Diazol Light Yellow N4J (Color Index 349a)
Brilliant Benzo Fast Violet 4BL (Color Index 353a)
Dianol Red 2B (Color Index 434)
Fast Light Yellow G (Color Index 636)
Chlorophenine Y (Color Index 814)
Thioflavine S (Color Index 816)

Acetate dyes

The dyes of United States Patents 1,805,919, 1,964,971, 1,970,669, and 2,434,765 and like dyes used in dyeing of cellulose acetate may be employed for coloring of the glass fabric.

Metallized dyes

The sulfonic substituted metallic compounds of monoazo dyestuffs numbered from 1, 17-19, 20-39, 42, 43, 45, and 56-60 in the table disclosed in United States Patent 2,008,602, or any one of the water-soluble metallic complexes of monoazo dyes currently used for dyeing fabrics may be employed for coloring the glass fabric.

The exact theory for my method of color dyeing is not known, but is believed that the applicant is the first to color glass fabric with a wide range of dyes evenly and in deep shades with an inexpensive process not involving padding with gelatin or resins and yielding a product which is fast to dry cleaning and washing, and shows no appreciable crocking.

This application is a continuation-in-part of my application Serial No. 68,051, filed December 29, 1948, now U.S. Patent 2,645,553, issued on July 14, 1953.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claims.

I claim:

1. The process of coloring woven glass fabric which consists treating said fabric with an aqueous solution consisting of a hydroxide selected from the class consisting of ammonium and alkali metal hydroxides and a low molecular weight, water-soluble, compound containing an acid radical selected from the group consisting of acetate, borate, bromate, bromide, carbonate, chloride, formate, oxalate, phosphate, propionate and sulfate, at a temperature in the range of 75° C. to the boiling point, said solution having a pH in the range of 9 to 13 and then treating said fabric with a dyestuff not requiring a chemical reduction for application.

2. The process of coloring woven glass fabric which consists treating said fabric at a temperature in the range of 75° C. to the boiling point with an aqueous solution consisting of a hydroxide selected from the class consisting of ammonium and alkali metal hydroxides and from about 0.01% to about 10% based on the weight of said fabric of a low molecular weight, water-soluble, compound containing an acid radical selected from the group consisting of acetate, borate, bromate, bromide, carbonate, chloride, formate, oxalate, phosphate, propionate and sulfate, said solution having a pH in the range of 9 to 13 and treating said fabric with a dyestuff not requiring a chemical reduction for application.

3. The process according to claim 1, wherein the low molecular weight water soluble compound is sodium phosphate.

4. The process according to claim 1, wherein the low molecular weight water soluble compound is sodium sulfate.

5. The process according to claim 1, wherein the low molecular weight water soluble compound is potassium acetate.

6. The process according to claim 1, wherein the low molecular weight water soluble compound is ammonium formate.

7. The process according to claim 1, wherein the low molecular weight water soluble compound is sodium chloride.

References Cited in the file of this patent

UNITED STATES PATENTS

| | | |
|---|---|---|
| 2,375,839 | Denny | May 15, 1945 |
| 2,582,919 | Biefeld | Jan. 15, 1952 |
| 2,645,553 | Lawsberg | July 14, 1953 |

OTHER REFERENCES

Textile Manufacturer for August 1947, page 381.